United States Patent [19]

Miura et al.

[11] Patent Number: 5,235,588
[45] Date of Patent: Aug. 10, 1993

[54] MAGNETO-OPTIC READING AND RECORDING HEAD USING EXTERNAL RESONATOR HAVING SEMICONDUCTOR LASER

[75] Inventors: Kazunori Miura, Atsugi; Ippei Sawaki, Sagamihara, both of Japan

[73] Assignee: Fujitsu Limited, Kawasaki, Japan

[21] Appl. No.: 568,738

[22] Filed: Aug. 17, 1990

[30] Foreign Application Priority Data

Aug. 19, 1989 [JP] Japan ................... 1-213453
Aug. 24, 1989 [JP] Japan ................... 1-217736
Jun. 7, 1990 [JP] Japan ................... 2-149301

[51] Int. Cl.$^5$ ................................. G11B 7/00
[52] U.S. Cl. ........................... 369/110; 369/112; 369/116; 369/13
[58] Field of Search ............. 369/110, 116, 112, 124, 369/103, 107, 106, 44.24, 44.32, 108, 13

[56] References Cited

U.S. PATENT DOCUMENTS 5,045,868 9/1991 Tajima ..................... 369/44.24

FOREIGN PATENT DOCUMENTS 1-182947 7/1989 Japan.

OTHER PUBLICATIONS

"Integrated and Guided-Wave Optics 1988 Technical Digest Series, vol. 5" Optical Society of America, Mar. 28–30, 1988.
"Japanese Journal of Applied Physics vol. 28 (1989) Supplement 28-3", Dec. 25, 1989.
"Extended Abstracts (The 50th Autumn Meeting, 1989); The Japan Society of Applied Physics No. 3" Sep. 27, 1989.
"Detection of Magneto-Optic Signals Using a Ring Cavity Laser Diode", Sep. 26–28, 1989.

Primary Examiner—Aristotelis Psitos
Assistant Examiner—Muhammad Edun
Attorney, Agent, or Firm—Staas & Halsey

[57] ABSTRACT

A magneto-optic disc recording and reading head having an orthogonal two mode oscillation type of external resonator having a semiconductor laser, including a device for differentiating the directions of propagation of two modes of light from one another to prevent the two modes of light from being united in the laser.

15 Claims, 8 Drawing Sheets

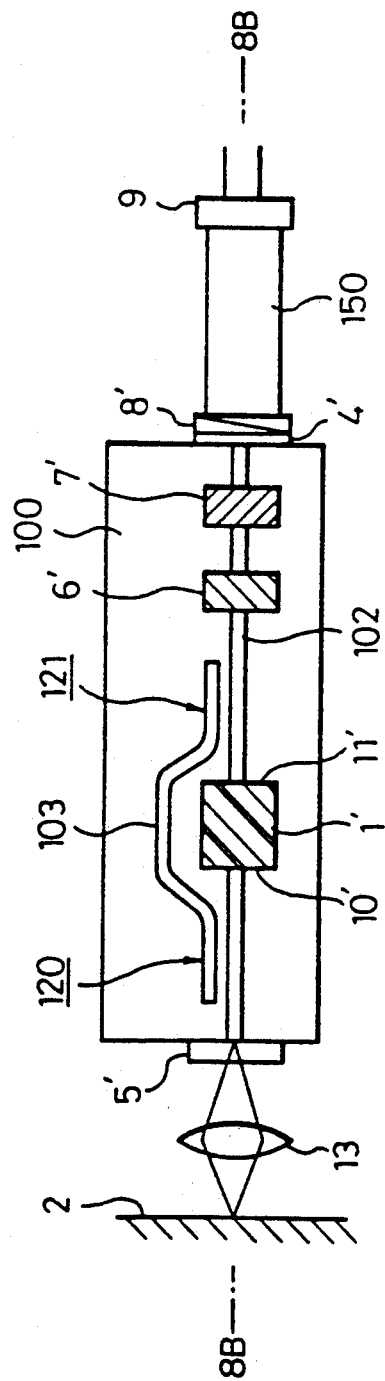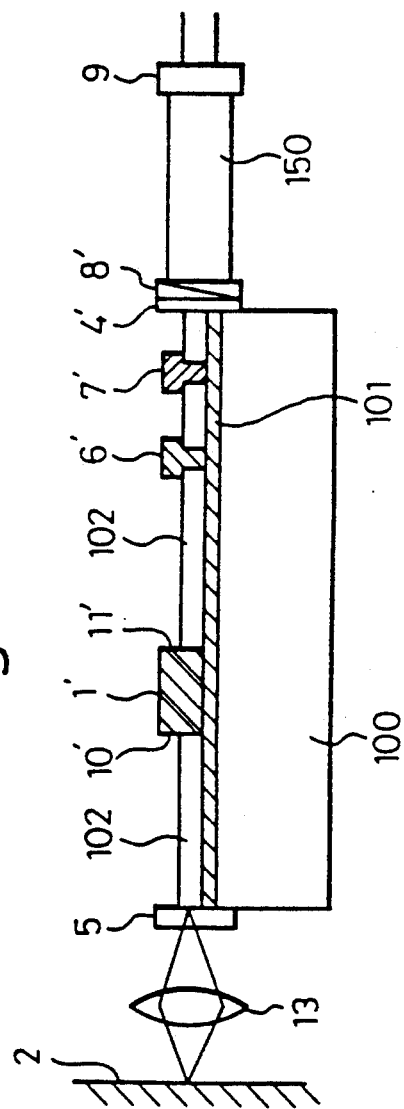

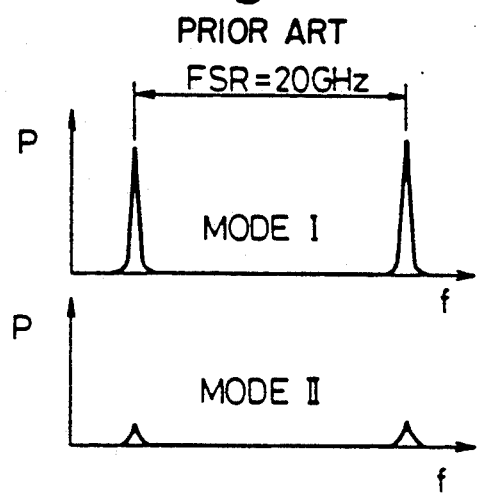
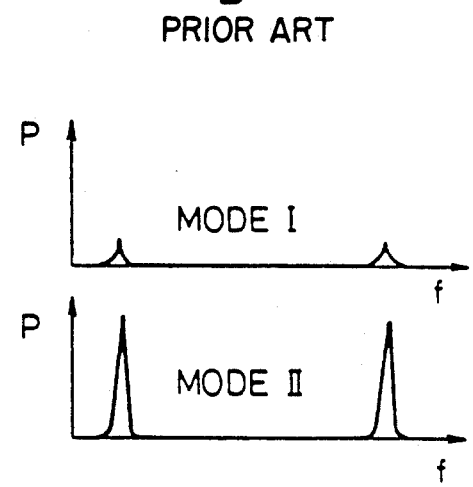
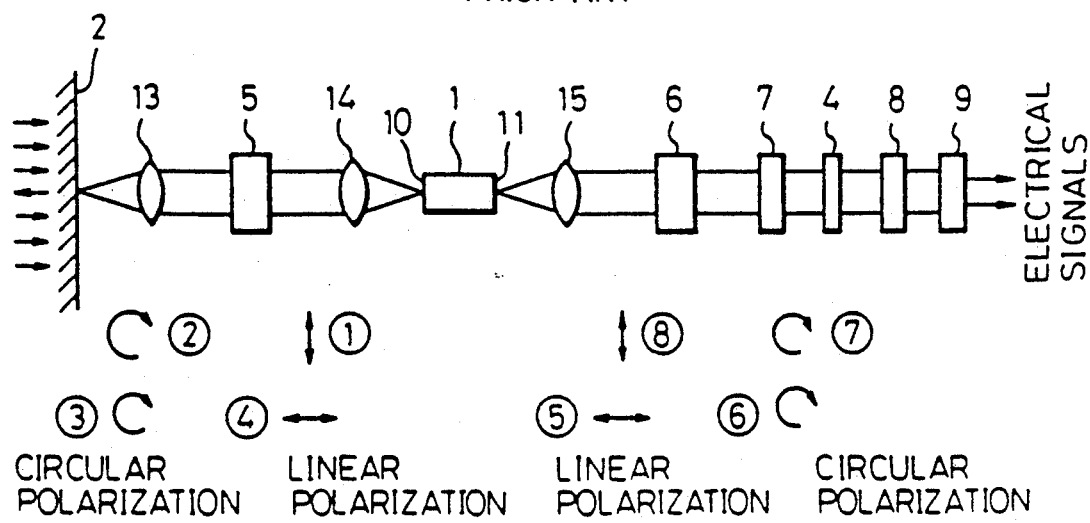

MAGNETO-OPTIC READING AND RECORDING HEAD USING EXTERNAL RESONATOR HAVING SEMICONDUCTOR LASER

BACKGROUND OF THE INVENTION

1. Field of the Invention

The present invention relates to an improved magneto-optic head for reading and recording a magnetooptic disc, which constitutes an external semiconductor laser resonator in which the magneto-optic disc is used as a reflection plane.

2. Description of the Related Art

Recent remarkable developments of an optical disc system, particularly employing an optical disc as a recording medium thereof, and in which data is recorded, reproduced and erased using a laser beam, have brought about a wide spread use of compact discs (CD) and a CD-ROM as a Read Only Memory for personal computers. Furthermore, an application of the optical disc system to office automation (OA) equipment or other information-related equipment, as a mass storage unit, is expected. In particular, a rewritable optical disc system is being developed to provide a memory capacity larger than the capacity offered by the magnetic disc system most commonly used as a file memory.

To enable the use of a magneto-optic disc as a rewritable optical disc system, there is the need for a development of an improved magneto-optic recording and reading head having a high S/N and ensuring stable reading.

Data is recorded on a surface of a magneto-optic disc by changing the direction of magnetization at small spots (pits) so that, when a light is made incident thereon, the polarization plane of the reflected light is subject to the Kerr effect, i.e., rotation to the right or left depending on the direction of the magnetization.

The reflected light is detected by a detector, after it is transmitted through a polarizer (analyzer), to read the recorded data, but usually, since the angle of Kerr rotation is very small, the quantity of signal light which can be utilized thereby is very small, e.g., a maximum of 0.1% of the total quantity of light incident upon the magneto-optic disc, and thus the signal light is easily influenced by noise.

To solve this problem, it is known that the reflected light can be split into two beams by a polarization beam splitter, the two split light beams being received by two respective detectors and detected by a differential detection method to thereby read the recorded data with less noise and a high S/N. Nevertheless, a differential detection method using two detectors complicates the optical system and the electrical signal processing system.

Further, attempts have been made to read the recorded data by using an external semiconductor laser resonator in which the magneto-optic disc constitutes one of the reflection planes thereof. For example, Japanese Unexamined Patent Publication (Kokai) No. 1-182947 (corresponding to USSN 295,753) discloses such an external semiconductor laser resonator in which the recorded data is read by detecting, for example, beat signals, as shown in FIG. 12.

In FIG. 12, 2 designates a magneto-optic disc having a magnetic recording layer in which data is recorded by magnetization in one direction (shown by arrows), and 1 denotes a semiconductor laser provided, on the opposite end surfaces of which are formed anti-reflection coatings 10 and 11. A first quarter wave plate ($\lambda/4$ plate) 5 is provided between the magneto-optic disc 2 and the semiconductor laser 1.

The magneto-optic recording and reading head also includes a second quarter wave plate ($\lambda/4$ plate) 6, a Faraday rotation element 7, an output mirror 4 through which light can be partly transmitted, a polarizer 8, and an optical detector 9 such as a PIN photodiode, on the opposite side of the semiconductor laser 1 to that of the first quarter wave plate 5, in this order. The magneto-optic recording and reading head further includes a first collimating lens 14 provided between the laser 1 and the first quarter wave plate 5, an objective lens 13 provided between the quarter wave plate 5 and the magneto-optic disc 2, and a second collimating lens 15 provided between the laser 1 and the second quarter wave plate 6.

In this optical system, light emitted from the laser 1 oscillates through the $\lambda/4$ plate 5→the magneto-optic disc 2→the $\lambda/4$ plate 5→the laser 1→the $\lambda/4$ plate 6→the Faraday rotation element 7→the output mirror 4→the Faraday rotation element 7→the $\lambda/4$ plate 6→the laser 1, to perform a laser oscillation.

During this laser oscillation, for example, a linear polarization light ① in a TM mode (in which an electric field component exists in a plane perpendicular to an active layer of the semiconductor laser) transforms the mode thereof in the following manner, ②→③→/e,crc/4/ , and is returned as a linear polarization light ④ in a TE mode (in which an electric field component exists in a plane parallel to an active layer of the semiconductor laser). The returned light (TE mode) is then incident upon the output mirror side and transforms the mode thereof like in the sequence ⑤→⑥→⑦→⑧ and is returned as a TM mode ⑧. A similar laser oscillation occurs for the modes (not shown) perpendicular to the modes ①-⑧.

Namely, two polarization modes perpendicular to each other exist, and are simultaneously generated in the resonator. In theory, the two modes are absolutely the same as each other and have the same wavelength (oscillation frequency), but due to the difference in phase between a right (or clockwise)-rotated circular polarization light and a left (or counterclockwise)-rotated circular polarization light, caused by the Kerr rotation of the magneto-optic effect of the two mode signals on the magneto-optic disc, a variation of the resonator length (cavity length of the resonator) occurs in practice, thereby resulting in a slight change of the oscillation frequency of the two mode signals.

When the two laser beams having different frequencies are superimposed, a beat signal corresponding to the difference between the frequencies is produced, and this beat signal can be detected by the optical detector 9 to thereby read the recorded data.

Assuming that the Kerr rotation angle is $\theta_1$ (radian) when a beam spot is incident upon the recording pit having a predetermined magnetization direction, a beat frequence $f_1$, is expressed by the following formula (see JPP' 947 mentioned above):

$$f_1' = c\theta_1/2\pi L \ldots \quad (1)$$

wherein, c is the speed of light ($c = 3 \times 10^9$ m/sec), and L is the effective cavity length of the resonator (i.e., the distance between the magneto-optic disc and the output mirror).

When the magneto-optic disc 2 is rotated, so that a beam spot is incident upon a recording pit in a magnetized area having an opposite magnetization direction, the rotation angle of the Kerr effect becomes $\theta_2$, and thus the beat frequency $f_1'$ is changed to $f_2'$, as expressed by the formula (1). The difference of the beat frequencies $f_1$, and $f_2'$ makes it possible to read the recorded data.

Since the Faraday rotation element 7 is inserted in the light path, even if a plane mirror is used in place of the magneto-optic disc 2, the beams ② and ②' (not shown) having a circular polarization light and perpendicular to each other, are subject to a bias rotation of angle $2\theta$, and thus a beat signal having, for example, a beat frequency F obtained by the formula (1), is produced.

On the other hand, when the magneto-optic disc 2 (i.e., rather than the plane mirror) is located at the reflection plane, as shown in FIG. 12, the light is further subject to the Kerr rotation of an angle $+\Delta\theta$ or $-\Delta\theta$, depending on the direction of magnetization thereof, and thus the resultant angle of the bias rotation becomes $2\theta \pm \Delta\theta$. Therefore, the beat frequency of the beat signal from both is:

$$F \pm \Delta F \ldots \quad (2)$$

Consequently, the circular polarization lights ⑦ and ⑦' (not shown), perpendicular to each other and emitted from the output mirror 44, are converted to two beams of light having the same plane of polarization, through the polarizer 8, and are then made incident upon the optical detector 9 as a light beat signal to thereby permit detection of the recorded data.

In the prior art mentioned above, however, since the TE mode light and the TM mode light pass in the laser 1 in the same direction, the two modes of light tend to be united and influenced by one another, so that the light power of one of the mode lights moves to the other mode light.

FIG. 11A and 11B show experimental data of the vertical oscillation modes of the prior art, in which the ordinate designates the light output and the abscissa the oscillation frequency. In the measurements shown in FIGS. 11A and 11B, a plane mirror was used instead of the magneto-optic disc 2, in the optical system shown in FIG. 12, to produce a laser oscillation. The laser beam emitted from the output mirror 4 was split into the TE mode light (represented by Mode I) and the TM mode light (represented by Mode II) by a polarization beam splitter and made incident upon a Fabry-Perot interferometer, so that the interference spectrum of light emitted from the Fabry-Perot interferometer was measured and recorded by a light power meter. Note that "FSR" in FIG. 11A stands for Free Spectral Range of the Fabry-Perot interferometer and was 20 GHz.

In FIG. 11A, the plane mirror, used instead of the magneto-optic disc 2, was located in parallel with the output mirror 4, and thus the output of Mode II is much smaller than that of Mode I.

On the other hand, in FIG. 11B in which the plane mirror was fixed and the output mirror 4 was inclined thereto at a slight inclination angle to vary the oscillation conditions, the output of Mode I is much smaller than that of Mode II. These experiments were carried out for different oscillation conditions, and proved that an outstanding imbalance exists between the outputs of Mode I and Mode II, thus resulting in an unbalanced oscillation of the two modes. Namely, it was experimentally confirmed that the light power moves from one to the other of the modes of light.

Where there is a considerable imbalance of the oscillation outputs of the two modes, the intensity of the beat signal between the two mode laser beams becomes low, resulting in a poor S/N.

The primary object of the present invention is to solve the problem mentioned above.

SUMMARY OF THE INVENTION

Namely, the present invention provides a magneto-optic disc recording and reading head having an orthogonal two mode oscillation type of external resonator having a semiconductor laser, comprising means for differentiating the respective directions of propagation of two modes of light to thereby prevent the two modes of light from being united in the laser.

According to an aspect of the present invention, there is provided a magneto-optic head system having an orthogonal two mode oscillation type of external resonator in which a magneto-optic disc constitutes one of the reflection planes thereof and which has an output mirror, wherein two modes of laser beams having different frequencies are oscillated due to a phase difference existing between a right-rotated circular polarization light and a left-rotated polarization light, due to the Kerr rotation on the magneto-optic disc, so that a light beat signal of the two modes of laser beams is detected thereby to read data recorded on the magneto-optic disc, wherein the external resonator comprises at least two mirrors, in addition to the magneto-optic disc and the output mirror, to thereby form a by-pass light path which is partly and spatially separated from a main light path of the resonator on opposite sides of the semiconductor laser, so that the respective directions of propagation of the oscillating two modes of polarization light are opposite to each other in the semiconductor laser.

According to another aspect of the present invention, there is provided a magneto-optic head system having an orthogonal two mode oscillation type of external resonator in which a magneto-optic disc constitutes one of the reflection planes thereof and which has an output mirror defining another reflection plane, wherein two modes of laser beams having different frequencies are oscillated due to a phase difference existing between a right-rotated circular polarization light and a left-rotated polarization light, due to the Kerr rotation on the magneto-optic disc, so that a light beat signal of the two modes of laser beams is detected, thereby to read data recorded on the magneto-optic disc, wherein the external resonator comprises at least one mirror, in addition to the magneto-optic disc and the output mirror, to thereby form a ring resonator in which light paths of light incident upon and light reflected from the respective reflection planes are spatially separated, so that the respective directions of propagation of the oscillating two modes of polarization light are opposite to each other in the semiconductor laser.

Preferably, at least a part of the light path comprises an optical waveguide formed on a substrate.

With this arrangement, since at least one or two mirrors, in addition to the magneto-optic disc and the output mirror, are provided in the optical path within the resonator to form a by-pass optical path which is partly and spatially separated from the main optical path on the opposite sides of the laser, or to a ring resonator in which the optical paths of light incident on and reflected from the respective reflection planes are spatially separated from one another, so that the directions of propagation of two modes of light in the semiconductor laser are opposite to each other, no unification of the two modes of light in the laser takes place, and as a result, two polarization modes of light can be stably emitted at one time. Namely, a stable beat signal can be obtained, and thus the recorded data can be read with a high S/N. Furthermore, if at least a part of the optical path of the resonator comprises an optical waveguide formed on the substrate, there is afforded a light and small magneto-optic head of a simple construction.

BRIEF DESCRIPTION OF THE DRAWINGS

The invention will be described below in detail with reference to the accompanying drawings, in which:

FIG. 8A is a schematic view of a sixth embodiment of a magneto-optic recording and reading head according to the present invention;

FIG. 8B is a sectional view in a plane taken along the line 8B—8B in FIG. 8A;

FIGS. 11A and 11B are diagrams of measurements of vertical oscillation data according to the prior art; and, FIG. 12 is a schematic view of an optical system of a known optical beat signal detection type of magneto-optic head.

DESCRIPTION OF THE PREFERRED EMBODIMENTS

Figure 1:
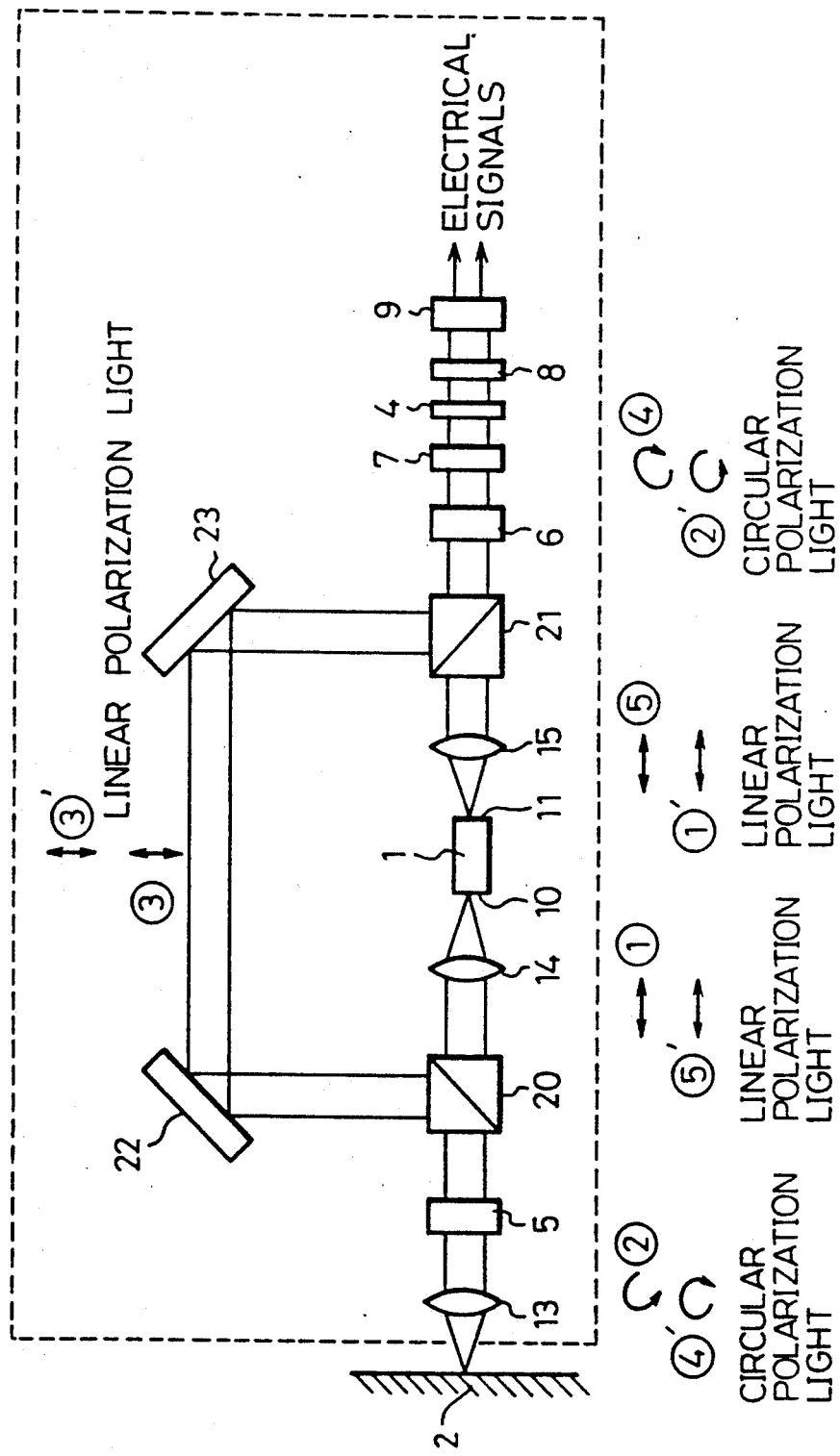
FIG. 1 is a schematic view of a first embodiment of a magneto-optic recording and reading head according to the present invention.

FIG. 1 shows a first embodiment of the present invention. In FIG. 1, the magneto-optic recording medium (magneto-optic disc) 2, which is made of a thin alloy layer such as Tb-Fe-Co, is formed on a silica glass substrate; 20 and 21 designate polarization beam splitters, each made of, for example, two transparent right-angle prisms which hold a multi-layered dielectric film therebetween, 22 and 23 are total reflection mirrors, 7 is a Faraday rotation element made of, for example, a crystal plate of Bi-added YIG, and 8 is a polarizer made of, for example, a crystal such as quartz-crystal.

In FIG. 1, elements corresponding to those shown in FIG. 12 are designated by the same reference numerals.

Light, e.g., TE mode light, emitted from the semiconductor laser (laser diode) 1, in the left-hand direction in FIG. 1, is collimated by the first collimating lens 14 and is oscillated along the light path of the first polarization beam splitter 20→the first λ/4 wave plate 5→the objective lens 13→the magneto-optic disc 2→the objective lens 13→the first λ/4 wave plate 5→the first polarization beam splitter 20→in the first total reflection mirror 22→the total reflection mirror 23→the second polarization beam splitter 21→the second λ/4 wave plate 6→the Faraday rotation element 7→the output mirror 4→the Faraday rotation element 7→the second λ/4 wave plate 6→the second polarization beam splitter 21→the second collimating lens 15→the semiconductor laser 1.

During this oscillation, the linear polarization light ①  in the TE mode is transformed to the circular polarization light ② →TE mode linear polarization light ③ →the circular polarization light ④ →the TE mode linear polarization light ⑤, in the this order.

Namely, the linear polarization light ①, which was TE mode in the semiconductor laser 1, is made incident upon the magneto-optic disc 2, for example, as a left-rotated circular polarization light ②, after passing the TE mode reflection type of polarization beam splitter 20 and the first λ/4 plate 5. The circular polarization light ② is reflected by the magneto-optic disc 2 and again transmitted through the first λ/4 plate 5 to become the linear polarization light ③ in the TM mode, perpendicular to the linear polarization light ①.

The TM mode linear polarization light ③ is reflected by the TM mode reflection type of polarization beam splitter 20, by the total reflection mirrors 22 and 23, and by the TM mode reflection type polarization beam splitter 21, and is transmitted through the second λ/4 plate 6 to become the right-rotated circular polarization light ④. The right-rotated circular polarization light ④ is transmitted through the Faraday rotation element 7 and subjected thereby to a predetermined bias rotation angle θ, reflected by the output mirror 4, and transmitted through the Faraday rotation element 7 to be again subjected thereby to the bias rotation angle θ. Namely, the right-rotated circular polarization light ④ is subjected to the bias rotation angle of 2θ in total. Thereafter, the light is transmitted through the second λ/4 plate 6 to become a TE mode linear polarization light ⑤, which is then transmitted through the second polarization beam splitter 21 to be made incident on the semiconductor laser 1 from the opposite side, i.e. from the right side thereof.

The other oscillation mode light is the TE mode linear polarization light ①', which has an opposite direction of propagation to that of the above mentioned oscillation mode, i.e., is emitted to the right side of the semiconductor laser 1 in FIG. 1.

The TE mode linear polarization light ①' tracks the same path as, but in the opposite direction to, that of the TE mode linear polarization light ① mentioned above, and is made incident upon the semiconductor laser 1 from the left side thereof, as the linear polarization light ⑤', The laser beams of more than one oscillation mode are obtained at one time on the incident surface of the magneto-optic disc 2, as two modes of circular polarization light ② and ④' perpendicular to each other.

In the illustrated embodiment, since the Faraday rotation element 7 is inserted in the light path, even if a plane mirror is used in place of the magneto-optic disc 2, the two circular polarization lights ②  and ④' of two respective modes perpendicular to each other are subject to the bias rotation angle of 2θ, so that the formula (1) mentioned before can be obtained. Note, however, the effective cavity length L in the formula (1) corresponds to the optical length 2L defined as follows, in the illustrated embodiment:

2L = optical length of one turn of the light path of the resonator.

Namely, the light beat of, for example, frequency F, can be produced.

Figure 2:
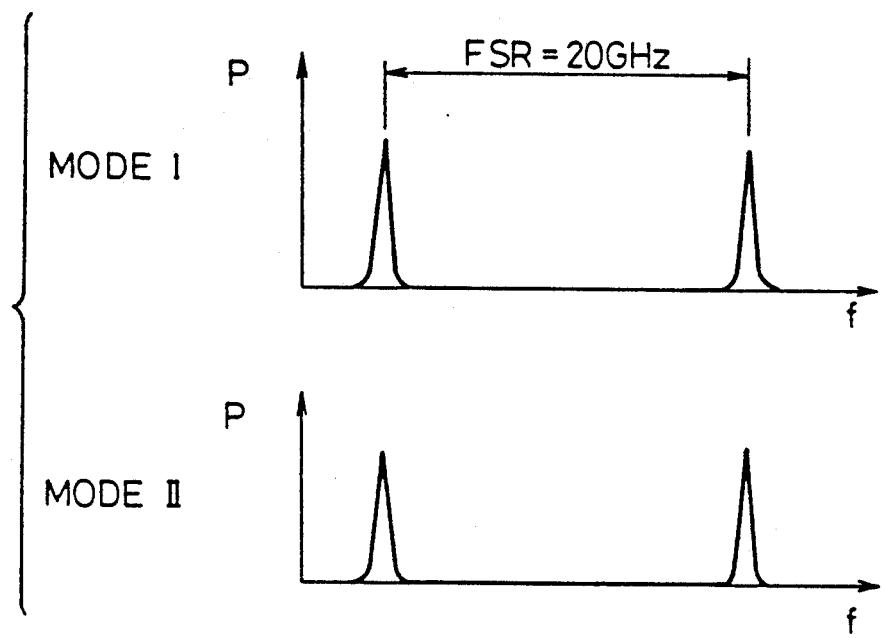
FIG. 2 is a diagram of measurement data of vertical oscillation modes in the embodiment shown in FIG. 1.

FIG. 2 shows data of measurements of the vertical oscillation modes in the embodiment shown in FIG. 1, similar to the data shown in FIGS. 11A and 11B.

In FIG. 2, the ordinate designates the light output and the abscissa designates the oscillation frequency, in both the Mode I and Mode II. The measurements were carried out in the same way as for FIGS. 11A and 11B, mentioned above.

As can be seen from FIG. 2, the oscillation outputs of the two modes (Mode I and Mode II) are well balanced. It was experimentally confirmed that, even under slight changes of the inclination angle of the output mirror 4 with respect to the plane mirror, to change the oscillation conditions, there was almost no imbalance of the outputs of the two modes, although the peak values of the outputs were slightly lowered.

Figure 3:
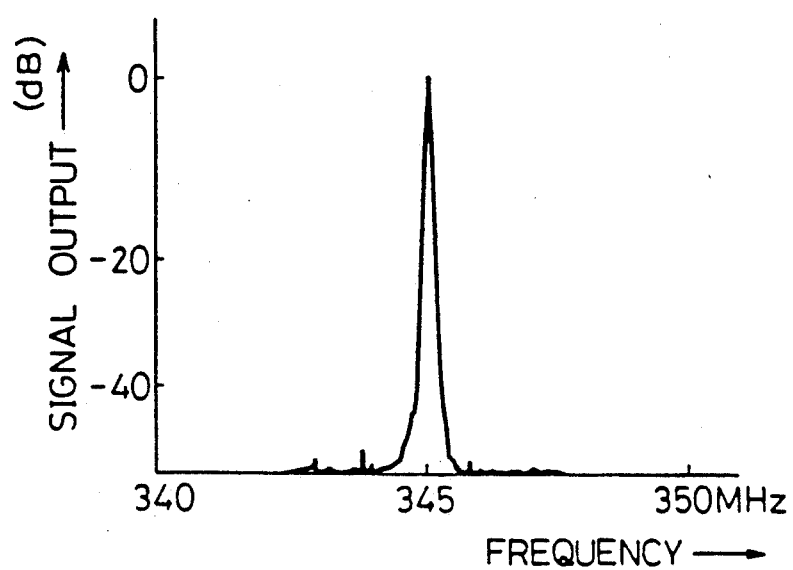
FIG. 3 is a diagram of measurement data of a beat signal in the embodiment shown in FIG. 1.

FIG. 3 shows data of measurements of the beat signal in the embodiment shown in FIG. 1. In FIG. 3, the ordinate designates the signal output dB level and the abscissa designates the beat frequency. The electrical signal outputs from the optical detector 9 shown in FIG. 1 were measured by a spectrum analyzer, and it can be seen that there is a sharp peak value of the output of the beat signal near F=345 MH.

When the magneto-optic disc 2 is located at the reflection plane, lights of two modes emitted from the output mirror 4 are subjected to the Kerr rotation of an angle $+\Delta\theta$ or $-\Delta\theta$, depending on the directions of magnetization of the magneto-optic disc 2, so that the resultant angle of the bias rotation becomes $2\theta \pm \Delta\theta$, and thus the beat frequency of the beat signal from both is $F \pm \Delta F$, as shown by the formula (2) mentioned before.

Consequently, the circular polarization lights 4 and 2', perpendicular to each other, emitted from the output mirror 4 are converted to two beams of light having the same plane of polarization, through the polarizer 8, and are then made incident upon the optical detector 9 as a light beat signal to thereby detect the recorded data.

In the illustrated embodiment, as a result of experiments in which the oscillation frequency of the laser was 830 nm, the reflection factor of the output mirror 4 was 95%, the optical length 2L of one turn of the light path of the resonator was 60 mm, and the biasing Faraday rotation angle θ was 5°, when the electrical signal outputs of the optical detector were detected by a spectrum analyzer, to measure the frequency change, stable high S/N beat signals of 270 MHz (F−ΔF) and 288 MHz (F+ΔF) corresponding to logical "1" and "0" of the recorded information pits, i.e., the directions of magnetization of the magneto-optic disc 2, were obtained, respectively.

Figure 4:
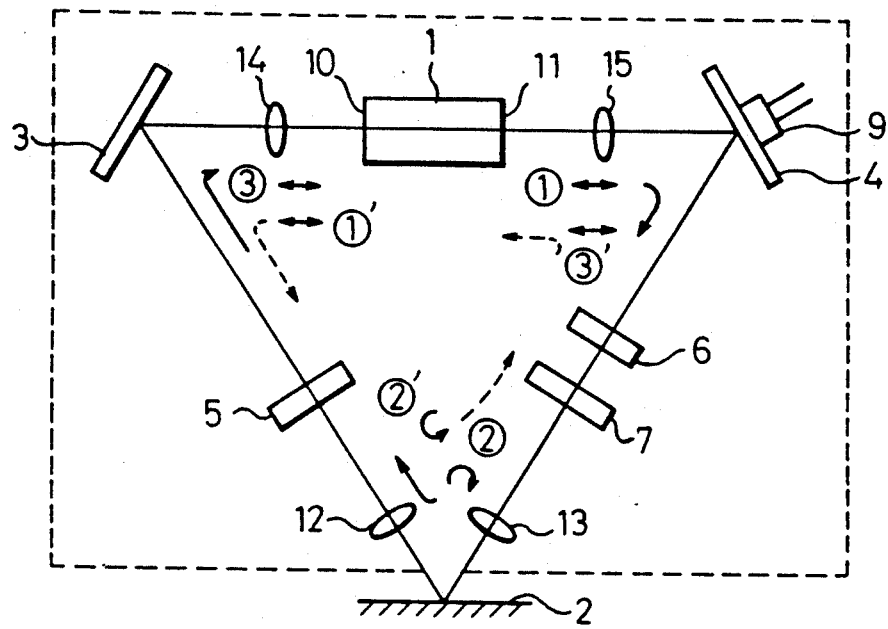
FIG. 4 is a schematic view of a second embodiment of a magneto-optic recording and reading head according to the present invention.

FIG. 4 shows a second embodiment of the present invention directed to a ring resonator in which at least one mirror in addition to the magneto-optic disc 2 and the output mirror (e.g. half mirror) 4 is provided in the resonator, so that optical paths of the incident light and reflected light for the respective reflection planes are completely spatially separated, unlike the first embodiment shown in FIG. 1, in which the optical path in the resonator is partly separated.

In FIG. 4, numeral 3 designates the total reflection mirror, and 12 and 13 are objective lenses. Further, in FIG. 4, elements corresponding to those in FIG. 1 are designated by the same reference numerals.

For example, the TE mode light emitted from the semiconductor laser 1 in the right hand direction in FIG. 4 is collimated by the collimating lens 15 and is oscillated along the light path of the output mirror 4→the second λ/4 wave plate 6→the Faraday rotation element 7→the objective lens 13→the magneto-optic disc 2→the objective lens 12→the first λ/4 wave plate 5→the total reflection mirror 3→the collimating lens 14 →the semiconductor laser 1, and during this oscillation, the linear polarization light ① of TE mode is transformed to the right-rotated circular polarization light ②→the TE mode linear polarization light ③ in this order, and made incident upon the semiconductor laser 1 from the left side thereof.

The circular polarization light ② is transmitted through the Faraday rotation element 7 and subjected thereby to a predetermined bias rotation angle θ, and then transmitted through the output mirror 4, which permits a part of the laser beam to pass therethrough and accordingly to be made incident upon the optical detector 9.

The other oscillation mode light is the TE mode linear polarization light 1', which has an opposite direction of propagation to that of the above-mentioned oscillation mode, i.e., is emitted to the left side of the semiconductor laser 1 in FIG. 4.

The TE mode linear polarization light ①' tracks the same path as, but in the opposite direction to, that of the TE mode linear polarization light ① mentioned above, and is made incident upon the semiconductor laser 1 from the right side thereof, as the linear polarization light ③'. The circular polarization light ②' is transmitted through the Faraday rotation element 7 and subjected thereby to a predetermined bias rotation angle θ, and then transmitted through the output mirror 4, which permit a part of the laser beam to pass therethrough and accordingly to be made incident upon the optical detector 9.

Accordingly, laser beams having more than one oscillation mode are obtained at one time on the incident surface of the magneto-optic disc 2, as two modes of circular polarization light ② and ②' perpendicular to each other.

As understood from the foregoing, light is subjected to the bias rotation angle of θ by the Faraday rotation element 7, as well as the Kerr rotation angle of $+\Delta\theta$ or $-\Delta\theta$ by the magneto-optic disc 2, i.e., rotation angle of $(\theta \pm \Delta\theta)$ in total, and thus two values of the beat frequencies of the beat signals due to the two beams of oscillation light, different from $(f \pm \Delta f)$, can be obtained to thereby detect the recorded data by the optical detector 9.

Note that, in the embodiment shown in FIG. 4, since the two modes of polarization light become an identical polarization light on the mirror 4, the polarizer 8 located in front of the optical detector 9 in the first embodiment shown in FIG. 1 can be omitted.

It is possible to provide two Faraday rotation elements 7 in the respective light paths on the opposite sides of the semiconductor laser 1, but in this alternative, the bias frequency is doubled, i.e., 2f.

It is also possible to omit the Faraday rotation element 7 for biasing, by slightly deviating the thickness of both or one of the λ/4 plates 5 and 6 from the ¼ wavelength or by deviating the λ/4 plates 5 and 6 from a perpendicular arrangement, to give a phase difference between the two modes.

Although the above discussion has been directed to the TE mode light emitted from the laser 1, it can be similarly applied to the TM mode light emitted from the laser 1.

Figure 5:
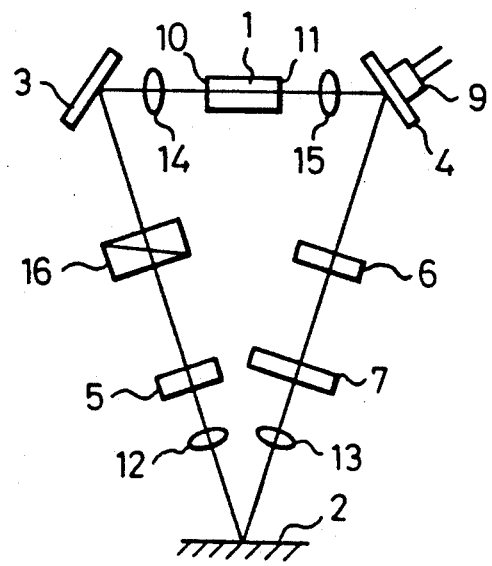
FIG. 5 is a schematic view of a third embodiment of a magneto-optic recording and reading head according to the present invention.

FIG. 5 shows still another embodiment (third embodiment) of the present invention. In FIG. 5, the polarizer 16 is inserted between the semiconductor laser 1 and the θ/4 plate 5 (or 6), to positively eliminate the unnecessary polarization mode, e.g., the TM mode light component, and thereby enhance the stability of the laser oscillation.

Figure 6:
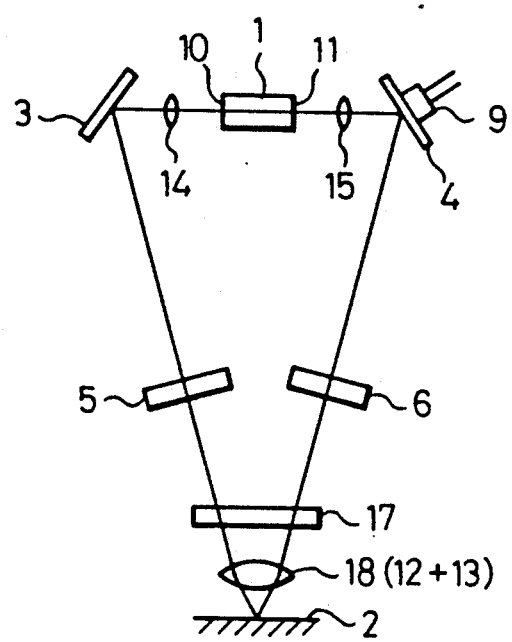
FIG. 6 is a schematic view of a fourth embodiment of a magneto-optic recording and reading head according to the present invention.

FIG. 6 shows a fourth embodiment of the present invention, in which the light paths of light incident on and light reflected from the magneto-optic disc 2 are closer to each other than in the second and third embodiments shown in FIG. 4 and 5, so that the objective lenses 12 and 13 in FIG. 4 are replaced by a single objective lens 18. Also, in the arrangement shown in FIG. 6, the Faraday rotation element 17 is inserted in both light paths of incident light and reflected light, for a simplification and minimization of the overall magneto-optic head construction.

Figure 7:
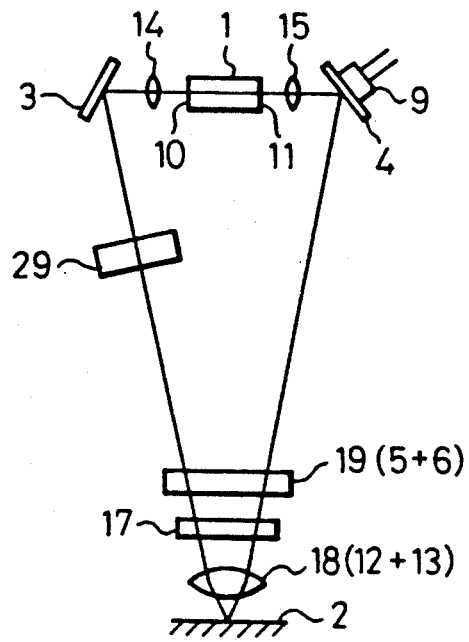
FIG. 7 is a schematic view of a fifth embodiment of a magneto-optic recording and reading head according to the present invention.

FIG. 7 shows a fifth embodiment of the present invention, in which numeral 29 designates a λ/2 plate.

In the previously mentioned embodiments, the separate λ/4 plates are provided in the respective different light paths, but in the fifth embodiment shown in FIG. 7, one objective lens 18 (equivalent to the objective lenses 12 +13), one Faraday rotation element 17, and one λ/4 plate 19 (equivalent to the λ/4 plates 5 +6) are commonly inserted in both light paths of the incident light and reflected light, to realize a simpler optical arrangement. In the fifth embodiment shown in FIG. 7, since the TE mode light, which is reflected by the magneto-optic disc 2, is transmitted through the λ/4 plate 19 in which the TE mode light is converted to the TM mode light, the λ/2 plate 29 is inserted between the semiconductor laser 1 and the λ/4 plate 19 to enable a polarization mode conversion from TM to TE (TM→TE).

Although the three mirrors (reflection planes) including the magneto-optic disc 2 constitute the ring resonator in the illustrated embodiments, it is possible to use four or more mirrors.

FIG. 8A and 8B respectively are a front elevational view of a sixth embodiment of the present invention and a sectional view thereof taken along the line I 8B—8B in FIG. 8A, respectively.

In FIGS. 8A and 8B, numeral 100 designates a substrate, such as an Si substrate of, for example, 15×5 mm and having a thickness of 1 mm, and 101 is a thermally oxidized SiO₂ film, 102 designates an optical waveguide, and 103 is a by-pass optical waveguide of, for example, a plastic material. The optical waveguides 102 and 103 form respective directional couplers at portions 120 and 121, as is well known, to function as a directional coupler type of polarization beam splitter (e.g., M. Kobayashi, H. Terui and K. Egashira, Appl. Phys. Lett., Vol. 32, No. 5, pp. 300–302, 1978).

Numeral 1' designates a semiconductor laser having anti-reflection coatings 10' and 11' on the opposite end surfaces thereof and which is embedded in the optical waveguide 102 between the two directional coupler type of polarization beam splitters 120 and 121; 6' and 7' designate a chip type λ/4 plate and a chip type Faraday rotation element, which are also embedded in the optical waveguide 102 so as to be optically connected to each other, similarly to the laser 1', and 5' designates a small λ/4 plate of, for example, TiO₂, which is adhered to the left end of the optical waveguide 102 by an optical adhesive, to cover the same.

Numeral 4' designates the output mirror, and 8' designates a small polarizer of, for example, TiO₂. The output mirror 4' and the polarizer 8' are adhered to the end face (right end face) of the substrate 100 so as to cover the incident and emission end of the optical guidewave 102, by an optical adhesive, on the opposite side of the substrate 100 to the side thereof which the λ/4 plate 5' is adhered; 150 designates an optical fiber, and 9 is an optical detector.

The components of FIGS. 8A and 8B corresponding to those in the previously mentioned embodiments are designated by the same reference numerals. Furthermore, lead portions of the semiconductor laser are eliminated, for clarity.

In the embodiment shown in FIGS. 8A and 8B, the light path between the λ/4 plate 5 and the output mirror 4 in the resonator in the first embodiment shown in FIG. 1 is replaced by the optical waveguide 102 and the by-pass optical waveguide 103, formed on the single substrate 100, and the optical elements provided on the substrate are in the form of small chips which are optically connected so as to constitute a magneto-optic head. The function of the magneto-optic head is substantially the same as that of the first embodiment shown in FIG. 1.

In the embodiment shown in FIGS. 8A and 8B, the thickness of the magneto-optic head can be reduced to less than an order of a few mm, thus realizing a lighter and smaller magneto-optic head.

It was experimentally confirmed that, when the optical length 2L of one turn of the light path of the resonator was 60 mm and the rotation angle of the Faraday rotation element 7' was 5°, beat signals of 270 MHz and 287 MHz, depending on the direction of magnetization of the magneto-optic disc 2, were stably obtained.

The way in which the optical waveguide type of the substrate as mentioned above is manufactured will be explained below with reference to FIGS. 9A to 9E and 10A to 10E, by way of example.

Step (1)

Figure 9A:
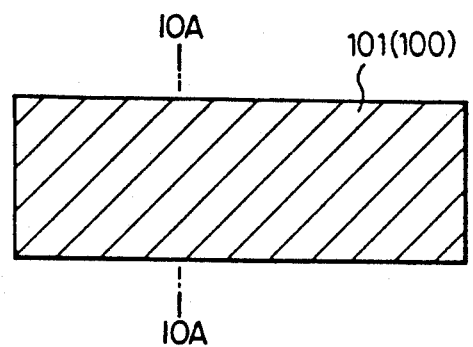
FIGS. 9A through 9E are schematic views showing successive steps in the production of a magnetooptic recording and reading head according to the present invention.
Figure 10A:
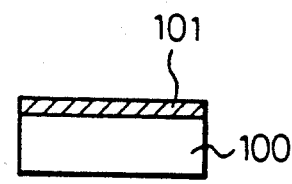
FIGS. 10A through 10E are sectional views taken along the lines 10A—10A, 10B—10B, 10C—10C, 10D—10D and 10E—10E in FIGS. 9A through 9E, respectively.

The flat Si-substrate 100 having, for example, a 15 mm length, 5 mm width and 1 mm thickness, is heated to 1050° C. in an oxygen atmosphere for 10 minutes to form thereon an insulation layer 101 of, for example, SiO₂, of 100 nm thickness (FIGS. 9A and 10A).

Step (2)

Figure 9B:
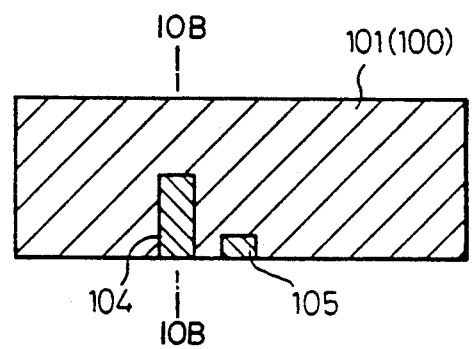
Figure 10B:
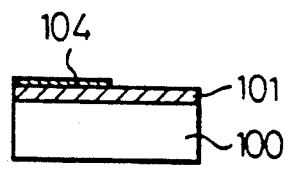

Au is vaporized to form an Au film 200 nm thick on the substrate 100 thus-obtained, to form the electrodes 104 and 105 of the respective dimensions 200 μm×2 mm and 200 μm×1 mm, for the semiconductor laser 1' (FIGS. 9B and 10B).

Step (3)

The optical waveguide 102 and the by-pass optical waveguide 103 are formed on the substrate obtained in step (2) above. The formation of the optical waveguide per se is known, for example, as disclosed in "Low loss single-mode plastic waveguide fabricated by photopolymerization" (in IGWO '88 Tech. Digest, Vol. 5, p-58, 1988).

To make a lower clad layer 110, the substrate is spun-coated with, for example, a 7 μm thickness of Polymethylmethacrylate (PMMA), which is solved in methylmethacrylate (MMA) monomer and then dried by heating to 90° C. for 30 minutes.

Thereafter, the substrate is spun-coated with PMMA, which is solved in styrene monomer, and is heated to 70° C. for 45 minutes to form a 5 μm thick optical waveguide 102 and by-pass optical waveguide 103 on the lower clad layer 110. Thereafter, the areas in which the optical waveguide 102 and the by-pass optical waveguide 103 are formed are illuminated with a predetermined quantity of UV (ultraviolet) light, using an exposure mask, to carry out a photopolymerization of the styrene monomer contained in the material of the optical waveguide layer, and subsequently, the substrate is immersed in ethyl alcohol at room temperature for about one minute, to solve and remove non-reactive styrene monomer in the non-exposed area, and then dried by heating. As a result, the non-exposed area forms a side clad layer 111 made of PMMA from which the styrene monomer has been removed, i.e., a material almost identical to the lower clad layer 110. The refractive index of the clad layers 110 and 111 is 1.49.

On the other hand, as a result of the photopolymerization of styrene monomer, the exposed area forms an area in which alcohol-unsolved polystyrene monomer is uniformly mixed with or copolymerized with PMMA. The refractive index of the exposed area is, for example, 1.51.

Figure 9C:
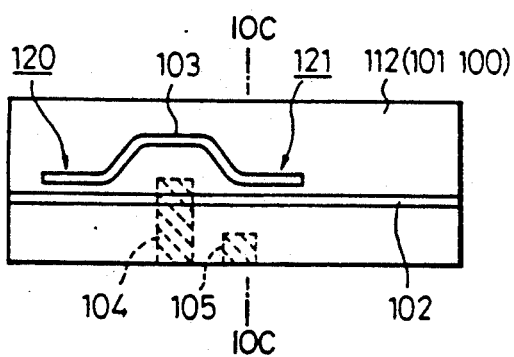
Figure 10C:
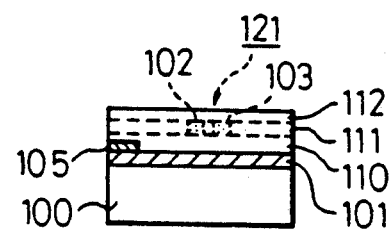

Finally, an upper clad layer 112 is formed in the same manner was as the lower clad layer 110; consequently, each of the optical waveguide 102 and the by-pass optical waveguide 103, each of which is completely surrounded on all sides by the material having a refractive index of 1.49 and which itself has a refractive index of 1.51, is completed and thus the laser beam is enclosed to be transmitted therethrough (FIGS. 9C and 10C).

Preferably, the width of each of the optical waveguide 102 and the by-pass optical waveguide 103 is 3—7 μm, the length of the by-pass optical waveguide 103 is 5—10 mm, the distance between the optical waveguides at the directional coupler type of polarization beam splitters 120 and 121 is 5—7 μm, and the length of the coupling portion is properly determined so as to have a desired property.

Step (4)

Figure 9D:
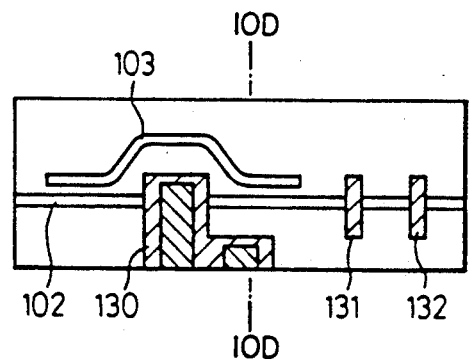
Figure 10D:
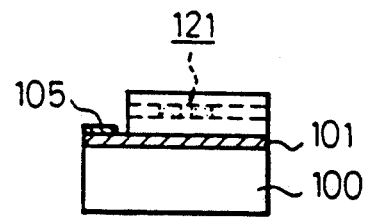

Thereafter, predetermined sizes of an exposure portion 130, and grooves 131 and 132 (FIG. 9D) are formed on the substrate at the locations in which the semiconductor laser 1', the λ/4 plate 6', and the Faraday rotation element 7' are placed. Namely, after a photomask, 100 nm thick, of a Ti film having openings corresponding to the exposure portion 130 and the grooves 131 and 132 is formed by a photoetching process, the substrate is ion-etched in an oxygen ($O_2$) environment to form the openings, i.e., the exposure portion 130 and the grooves 131 and 132, in the plastic optical waveguide layer (FIGS. 9D and 10D).

Step (5)

The chip type of semiconductor laser 1' is bonded to the electrode 104 of the exposure portion 130 by a known die bonding method. The semiconductor laser 1' is bonded to the other electrode 105, for example, by an Au wire 106, and a small piece of T-shaped λ/4 plate 6' of $TiO_2$, having a functional portion thereof of predetermined thickness is inserted in the groove 106 and adhered thereto, for example, by an optical adhesive made of a UV-hardening resin. Similarly, a small piece of a T-shaped Faraday rotation element 7' made of Bi-added YIG, having a functional portion of a predetermined thickness is inserted in the groove 132 and adhered thereto, for example, by an optical adhesive made of a UV-hardening resin.

Figure 9E:
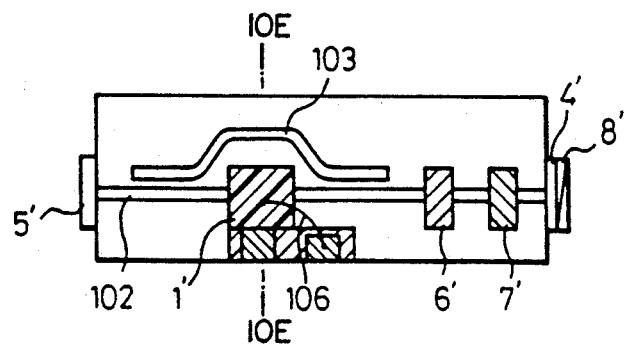
Figure 10E:
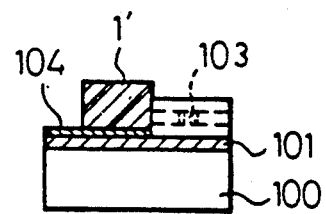

Thereafter, a small λ/4 plate 5' of $TiO_2$ is adhered to the end face of the substrate 100, for example, by an optical adhesive made of a UV-hardening resin, to cover the incident and emitting end of the optical waveguide 102 on the side adjacent to the magneto-optic disc 2. To the end of the opposite side of the substrate are adhered the output mirror 4' and a small polarizer 8' of $TiO_2$ in this order, to cover the opposite (i.e., right-side) incident and emitting ends of the optical waveguide 102. Thus, the waveguide portion constituting the resonator according to the present invention is fabricated (FIGS. 9E and 10E).

Note that an optical waveguide does not always require the upper clad layer 112, and accordingly, the latter can be omitted. The optical waveguide is not limited to the plastic optical waveguide as disclosed and instead can be replaced by another optical waveguide.

Furthermore, although the substrate 100 is made of an Si substrate having a good heat radiation effect, in the illustrated embodiments mentioned above, it can be made of another material.

As can be understood from the foregoing, according to the present invention, at least two mirrors are provided in the light path in the resonator, in addition to the magneto-optic disc 2 and the output mirror 4, to form a by-pass light path which is partly, spatially separated from the main light path on the opposite sides of the semiconductor laser 1, or to form a ring resonator in which the light paths of the incident light and the reflected light of the respective reflection planes are spatially separated, so that the directions of propagation of two modes of beams of oscillating light are opposite to each other in the semiconductor laser 1. Therefore, no unification of the two different polarization modes of light occurs in the semiconductor laser 1. Namely, two stable polarization modes of light can be oscillated at one time, thus resulting in a stable beat signal which makes it possible to read the recorded data with a high S/N.

Furthermore, when at least a part of the light path in the resonator is constituted by the optical waveguide formed on the substrate as herein disclosed, the optical elements can be easily adjusted by a simple construction, and accordingly, a small and light magneto-optic recording and reading head having an improved quality can be realized.

The present invention is not limited to the illustrated embodiments and can be variously modified without departing from the spirit of the invention.

I claim:

1. A magneto-optic head system for reading data recorded on a magneto-optic disc, comprising:

an orthogonal two mode oscillation type of external resonator in which the magneto-optic disc constitutes one reflection plane and which has an output mirror and wherein two modes of laser beams having different frequencies are oscillated due to a phase difference existing between a right-rotated circular polarization light and a left-rotated polarization light, due to the Kerr rotation of the two modes of leaser beams by the data recorded on the magneto-optic disc, producing a light beat signal of the two modes of laser beams which may be detected thereby to read data recorded on the magneto-optic disc;

the external resonator further comprising at least two mirrors, in addition to the magneto-optic disc and the output mirror, located so as to form a by-pass light path which is at least partly, spatially separated from a main light path of the resonator, on the opposite sides of the semiconductor laser, so that the respective directions of propagation of the oscillating two modes of polarization lights are opposite to each other in the semiconductor laser.

2. A magneto-optic head system according to claim 1, wherein at least a part of the light path of the external resonator comprises an optical waveguide.

3. A magneto-optic head system according to claim 2, wherein the by-pass optical path comprises a by-pass optical waveguide spaced from the optical waveguide.

4. A magneto-optic head system according to claim 2, wherein the optical waveguide is formed on a substrate.

5. A magneto-optic head system according to claim 4, wherein the by-pass optical waveguide is formed on the same substrate on which the optical waveguide is formed.

6. A magneto-optic head system for reading data recorded on a magneto-optic disc, comprising:

an orthogonal two mode oscillation type of external resonator in which the magneto-optic disc constitutes one reflection plane and which has an output mirror defining another reflection plane and wherein two modes of laser beams having different frequencies are oscillated due to a phase difference existing between a right-rotated circular polarization light and a left-rotated polarization light, due to the Kerr rotation of the two modes of laser beams by the data recorded on the magneto-optic disc, producing a light beat signal of the two modes of laser beams which may be detected thereby to read data recorded on the magneto-optic disc;

the external resonator further comprises at least one mirror, in addition to the magneto-optic disc and the output mirror, located so as to form a ring resonator in which the light paths of light incident upon, and light reflected from, the respective reflection planes are spatially separated, so that the respective directions of propagation of the oscillating two modes of polarization lights are opposite to each other in the semiconductor laser.

7. A magneto-optic head system according to claim 6, further comprising:

a single $\lambda/4$ plate, common to the light paths of light incident upon and light reflected from the magneto-optic disc, located between the semiconductor laser and the magneto-optic disc; and a $\lambda/4$ plate located between the semiconductor laser and the $\lambda/4$ plate.

8. A magneto-optic head system according to claim 6, further comprising:

a single $\lambda/4$ plate which is common to the light paths of light incident upon the light reflected from the magneto-optic disc, and which is located between the semiconductors laser and the magneto-optic disc.

9. A magneto-optic head system according to claim 6, further comprising:

two $\lambda/4$ plates perpendicular to each other and positioned between the semiconductor laser and the magneto-optic disc on respective, opposite sides of the semiconductor laser;

a Faraday rotation element provided in a light path of a collimated beam; and an optical detector provided outside the output mirror to detect the beat signal.

10. A magneto-optic head system according to claim 9, further comprising:

a polarizer located between the semiconductor laser and one of the $\lambda/4$ plates.

11. A magneto-optic head system according to claim 9, further comprising:

a single objective lens which is common to the light paths of light incident upon and light reflected from the magneto-optic disc, and which is located in front of the magneto-optic disc.

12. A magneto-optic disc reading head system for reading data magneto-optically stored in a magneto-optic disc, comprising:

an orthogonal two mode oscillation type resonator having a predetermined effective cavity length and outputting a beat signal indicating said stored data, said resonator further comprising:

laser means, including a semiconductor laser having first and second ends, for emitting orthogonal two mode lights from the first end thereof;

first polarization means, positioned so as to receive said two mode lights emitted from said laser means, for polarizing said received two mode lights, said magneto-optic disc being positioned so as to receive said two polarized lights, and being operative for changing the angles of said incident polarization lights in response to said data and for reflecting said angle-changed incident polarization lights to said first polarization means so as to be further polarized thereat, said laser means receiving and passing said further polarized lights to the second end thereof, a second polarization means, positioned so as to receive said two lights passed through said laser means, for polarizing said received lights, semi-transparent mirror means, positioned so as to receive and have incident thereon said two lights polarized at said second polarization means, for reflecting said incident two lights to said second polarization means so as to be further polarized thereat, and for passing a beat light produced by an interaction of said incident two lights, and said lights further polarized at said second polarization means being directed to and passing through said laser means, the distance between said magneto-optic disc and said semitransparent mirror means defining said effective cavity length, said resonator substantially resonating said orthogonal two mode lights therein, said beat light output from said semitransparent mirror means having a frequency defined by said effective cavity length and said angle change at said magneto-optic disc, and means for differentiating the directions of propagation of the two modes of light from one another to prevent the two modes of light from being united in the laser.

13. A magneto-optic disc reading head system according to claim 12, wherein said first polarization means comprises a first λ/4 plate.

14. A magneto-optic disc reading head system according to claim 13, wherein said second polarization means comprises a second λ/4 plate.

15. A magneto-optic disc reading head system according to claim 14, further comprising optical detection means for detecting the beat light and converting the detected beat light to an electrical signal.

* * * * *

UNITED STATES PATENT AND TRADEMARK OFFICE
CERTIFICATE OF CORRECTION

PATENT NO. : 5,235,588
DATED : August 10, 1993
INVENTOR(S) : Kazunori MIURA et al.

It is certified that error appears in the above-indentified patent and that said Letters Patent is hereby corrected as shown below:

Col. 2, line 29, change "/e,crc/4/" to --④--.

Col. 3, line 29, change "44" to --4--.

Col. 6, line 10, delete "in";
line 11, after "the" (first occurrence) insert --second--;
line 22, change "1inear" to --linear--.

Col. 8, line 45, change "permit" to --permits--.

Col. 9, line 35, after "respective" insert --,--;
line 56, change "I8B" to --8B--.

Col. 10, line 19, after "thereof" insert --to--.

Col. 11, line 35, change "was as" to --as was--.

Col. 12, line 1, after "of" (second occurrence) insert --a--.

UNITED STATES PATENT AND TRADEMARK OFFICE
CERTIFICATE OF CORRECTION

PATENT NO. : 5,235,588
DATED : August 10, 1993
INVENTOR(S) : Kazunori MIURA et al.

It is certified that error appears in the above-indentified patent and that said Letters Patent is hereby corrected as shown below:

Col. 13, line 2, change "leaser" to --laser--;

line 63, after "upon" insert --and--;
line 65, change "semiconductors" to --semiconductor--.

Signed and Sealed this

Thirteenth Day of September, 1994

Attest:

BRUCE LEHMAN

Attesting Officer

Commissioner of Patents and Trademarks